O. ROSCHANEK.
APPARATUS FOR MEASURING, INDICATING, AND REGISTERING DIFFERENCES OF PRESSURE.
APPLICATION FILED APR. 17, 1914.
1,173,038. Patented Feb. 22, 1916.
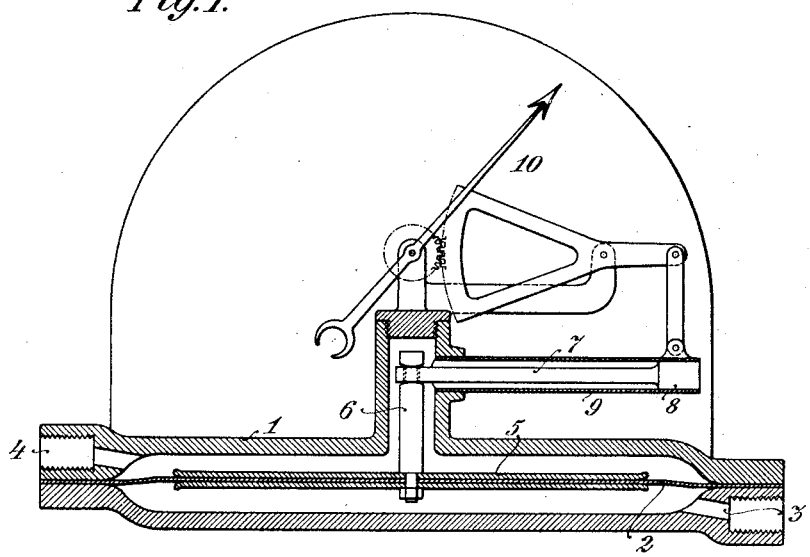
Fig. 1.
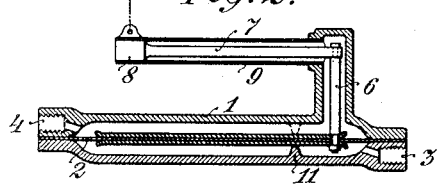
Fig. 2.
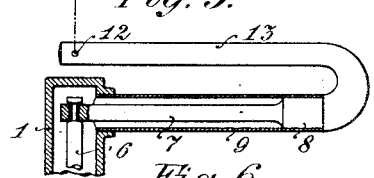
Fig. 3.
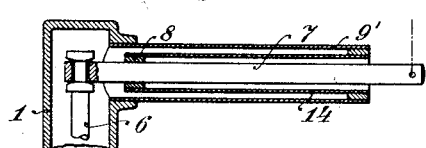
Fig. 4.
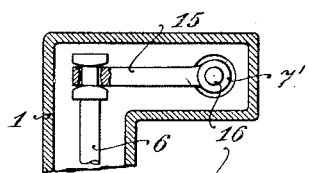
Fig. 6.
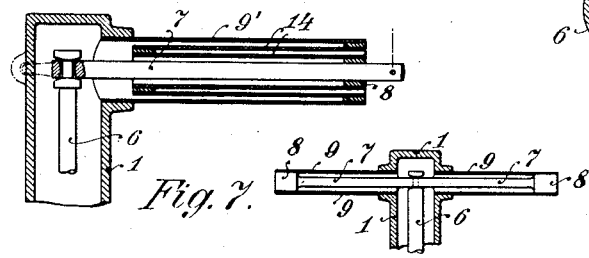
Fig. 5. Fig. 7.
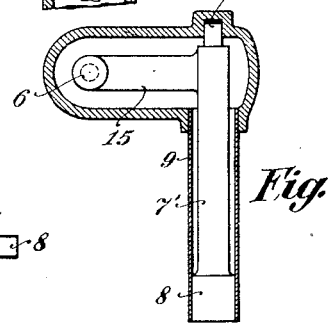
Fig. 6ª
Inventor
O. Roschanek,
Witnesses
F. M. Meyer
R. F. Beck
By ........
Attorney.

UNITED STATES PATENT OFFICE.

OTTO ROSCHANEK, OF VIENNA, AUSTRIA-HUNGARY.

APPARATUS FOR MEASURING, INDICATING, AND REGISTERING DIFFERENCES OF PRESSURE.

1,173,038. Specification of Letters Patent. Patented Feb. 22, 1916.

Application filed April 17, 1914. Serial No. 832,614.

*To all whom it may concern:*

Be it known that I, OTTO ROSCHANEK, engineer, citizen of the State of Austria, residing at Vienna, in the Province of Lower Austria, Austria-Hungary, have invented certain new and useful Improvements in Apparatus for Measuring, Indicating, and Registering Differences of Pressure; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in pressure indicating devices the primary object of which is to construct a device of this character which will be most sensitive to small differences in pressure.

Another object of the present improvement is to evolve a device in which a diaphragm is used to transmit and indicate small differences of pressure acting upon it to an indicating and recording apparatus and yet not be influenced by the working pressure itself.

The devices used heretofore for determining the differences of pressure in vessels have not been sufficiently sensitive. The most sensitive devices operate through the use of liquid but have the fault that the indicating liquid will be thrown out and the operation of the device interrupted. Devices of this character loose their sensitiveness due to the friction in the stuffing boxes used. Electric current is sometimes used as a transmitting means. All other apparatus have slidable or revoluble stuffing boxes or else sliding pistons and are found most insensitve because of the great friction occurring in their operation. The method of measuring the two pressures and determining the difference between them is very inaccurate. Differential gears also give faulty indications. None of the devices used having a registering index are capable of measuring the differences of pressure in water columns to a millimeter as is necessary.

The invention hereinafter shown and described will measure the smallest difference in pressure independent of the working pressure at the time. The apparatus has no stuffing boxes or rubbing parts and which operates the same whether under great or little pressure.

In the accompanying drawings:—Figure 1 is a sectional elevation showing an apparatus constructed in accordance with this invention. Figs. 2–5 show modified forms of execution using a flexible tube. Fig. 6 is an elevation, partly in section, of the construction shown in Fig. 6ª. Fig. 6ª is a plan view partly in section of the construction shown in Fig. 6. Fig. 7 is a diagrammatic elevation and shows a parallel arrangement for transmitting the strokes of the diaphragm.

Referring now to the drawings in which like reference numerals designate similar parts, 1 represents a casing which has clamped and secured therein a relatively large diaphragm 2, which is acted upon by the two pressures the difference of which is to be determined. The two pressures are admitted through the openings 3 and 4 into the compartments above and below the diaphragm. The said diaphragm is normally horizontal and may be provided at its center or both sides with a stiffening covering 5. The diaphragm illustrated in Fig. 1 carries in its center a bar 6 connected to a bolt 7. The said bolt is secured at 8 to a flexible tube 9 which is fixed at its outer end on the casing 1 and communicates with the interior of the same. The displacing of the diaphragm produced by the difference of the pressures existing on both sides of the diaphragm is transmitted to the bolt 7 which thereby bends the tube 9. The strokes of the tube 9 which in this manner are communicated without any friction, may be transmitted in any suitable way to an index, recorder or the like, means being interposed for increasing the movement of the tube to the recorder.

In the arrangement shown in Fig. 2 the bar 6 is secured eccentrically to the diaphragm which is supported by a transverse rib or edge 11 at a point a suitable distance from the securing point of the bar 6. Due to this arrangement the diaphragm acts in the manner of a lever upon the parts 6 and 7 which produce the alterations or bending of the tube 9.

In order to further utilize, for indicating purposes, the alterations of the tube 9 and the bolt 7 produced by the bending of the said tube the latter may be provided with an outer extension 13, which for example may be bent backward as illustrated in Fig. 3. The end of this extension is connected at 12 to the indicating device 10.

For further increasing the strokes one or more, tubes 14 may be secured to the outer rigid or flexible tube 9' which may be arranged one within the other and extend or prolong the tube 9'. One of the tubes 14 is connected to the bolt 7 influencing the diaphragm as shown in Figs. 4 and 5. One end of the bolt 7 may also be lodged in a fixed part for increasing the strokes, as shown for example by dotted lines in Fig. 5. Then again the strokes of the diaphragm may be transmitted to independent tubes in parallel as illustrated in Fig. 7. Also the strokes of the diaphragm may produce alterations in the tube 9 which may be used for indicating or registering purposes. In this case the bar 6 is, for example as shown in Fig. 6, connected to an arm 15 of the bolt 7', one end of which is journaled as at 16 so as to be capable of revolving the other end of such bolt 7' being secured at 8 to the tube 9. The movements of the tube are transmitted in any suitable manner to an index or recorder.

The device hereinbefore described operates of course, in all cases as a sensitive balance.

Claims.

1. A pressure indicating device comprising a casing, a diaphragm within the casing and having its edges rigidly mounted in the side walls of the casing, the said casing having inlets communicating with opposite sides of the diaphragm, a flexible member, an indicating device connected to the flexible member, a lever connecting the flexible member and the diaphragm, the said flexible member arranged to flex at an angle to its connection with the lever.

2. A pressure indicating device comprising a casing, a diaphragm within the casing and having its edges rigidly mounted in the side walls of the casing, the casing having inlets communicating with opposite sides of the diaphragm, a rod carried by the center of the diaphragm, an indicating device, a flexible tube mounted in the casing, a lever within the tube and connected to the said rod, the said lever within the tube having its outer end connected to the indicating device.

3. A pressure indicating device comprising a casing, a diaphragm within the casing and having its edges rigidly mounted in the side walls of the casing, the casing having inlets communicating with opposite sides of the diaphragm, a rod carried by the diaphragm, an indicating device, a flexible tube mounted in the casing, a lever within the tube and connected to the said rod, the said lever within the tube having its outer end connected to the indicating device.

4. A pressure indicating device comprising a casing, a diaphragm within the casing, the said casing having inlets on opposite sides of the diaphragm, a flexible tube mounted in the casing, members connecting the diaphragm and the flexible tube, whereby the movement of the diaphragm bends the tube, an indicating device, and means connecting the outer end of the flexible tube and the indicating device.

5. A pressure indicating device comprising a casing, a diaphragm within the casing and having its edges rigidly mounted in the side walls of the casing, the said casing having inlets communicating with opposite sides of the diaphragm, a flexible member, an indicating device connected to the flexible member, a lever connecting the flexible member and the diaphragm, the said flexible member and the diaphragm arranged parallel to each other, and the connecting lever arranged at right angles to both diaphragm and flexible member.

In testimony whereof I have signed my name to this specification in the presence of two subscribing witnesses.

OTTO ROSCHANEK.

Witnesses:
   Sigmund Bauer,
   August Fugger.